United States Patent Office 3,838,102
Patented Sept. 24, 1974

3,838,102
REMOVAL OF METALLIC CATALYST RESIDUE FROM POLYPHENYLENE ETHERS
James G. Bennett, Menands, and Glenn D. Cooper, Delmar, N.Y., assignors to General Electric Company
No Drawing. Filed Dec. 29, 1972, Ser. No. 319,160
Int. Cl. C08g 23/18
U.S. Cl. 260—47 ET    20 Claims

ABSTRACT OF THE DISCLOSURE

Metallic catalyst residues are removed from reaction solutions containing polyphenylene ethers produced by an oxidative coupling of a phenol in the presence of an oxygen-containing gas and a metal-amine complex catalyst. Removal of the metal component is effected by contacting the solution with a compound capable of selectively complexing with the metal to form a water soluble compound, removable by subsequent liquid-liquid extraction with an aqueous medium. The process is less expensive than prior art procedures, provides solutions which are more efficiently decolorized, and reduces the metallic residue content of the polyphenylene ether to levels lower than other commercially acceptable methods.

This invention relates to synthetic resins produced from phenols and, more particularly, to the separation of metallic catalyst residues from reaction solutions containing polyphenylene ethers.

BACKGROUND OF THE INVENTION

The polyphenylene ethers and processes for their preparation are known in the art and described in numerous publications including Hay, U.S. 3,306,874 and 3,306,875, incorporated herein by reference.

The processes most generally used to produce the polyphenylene ethers involve the self-condensation of a monovalent phenol in the presence of an oxygen-containing gas and a catalyst comprising a metal-amine complex.

At the conclusion of the reaction, the reaction solutions obtained, e.g., by oxidizing 2,6-xylenol with a copper-amine catalyst, are extracted with aqueous mineral acid or acetic acid or a mixture of water and carbon dioxide to remove the metallic component of the catalyst *and* the amine, before isolation of the polymer by precipitation with an antisolvent, such as methanol. It is important to remove the metallic catalyst residue from the reaction solution (and the polymer) because contamination of the polymer by metallic residues results in discoloration and degradation.

Recently, total isolation methods have also been developed, such as steam precipitation, spray drying, hot water crumbing, and the like, and these make it desirable to remove the metal component of the catalyst while leaving the amine in solution. The amine can then be recovered with the reaction solvent, thus eliminating a conventional, separate, amine recovery step.

Leaving the amine in the solution also has a further, unexpected benefit, in that it protects the polymer from a loss in molecular weight (as measured by a decrease in intrinsic viscosity) as is sometimes observed when the acid extraction technique is used. The presence of unextracted amine in the mixture also assists in decolorizing the solution if agents for this purpose are to be introduced later.

The above advantages are provided by the discovery of a new method which is extremely effective for removing metallic residues from polyphenylene ether reaction mixtures, yielding polymer with very low metal content after precipitation either conventionally by adding an antisolvent or by total isolation, e.g., by crumbing in hot water. The method involves adding a polyfunctional compound to the reaction mixture, the compound being capable of selectively complexing with the metallic component of the catalyst, to decompose the catalyst complex and form a water soluble, extractable composition plex and to form a water soluble, extractab'e composition component remains in solution with the polymer.

Only small amounts of the polyfunctional compound are required. For example, if ethylenediaminetetraacetic acid is used to treat a copper-amine catalyzed solution, polymer with a copper content of only 11 parts per million (p.p.m.) can be obtained at a 1.1:1 molar ratio of ethylenediamineteraacetic acid to copper.

Advantages in the use of a complexing agent over conventional acetic acid extraction include the following:

(i) Effective levels of ethylenediaminetetraacetic acid are as low as 1 pound per 100 pounds of polymer, whereas about 20 pounds of acetic acid per 100 pounds of polymer are required for adequate metal, e.g., copper, removal;

(ii) The cost of alkali metal hydroxide to recover amine from aqueous acetic acid extracts is entirely eliminated by use of a metallic ion complexing agent;

(iii) Decolorization of solutions of polymer after treatment with a metallic ion complexing agent instead of aqueous acid is easily achieved without appreciable reduction in intrinsic viscosity, i.e., molecular weight, of the final product; and (iv) The product of the present process, even though produced more economically than the acid-extracted product, is fully equivalent in physical properties after compounding with styrene resins into commercially important modified polyphenylene ethers, and molding.

DESCRIPTION OF THE INVENTION

According to the present invention, in a process for forming a polyphenylene ether by an oxidative coupling reaction in the presence of a chelatable metal ion-amine complex catalyst comprising passing an oxygen-containing gas through a reaction solution and said complex catalyst, said reaction solution being capable of liquid-liquid extraction with an aqueous solution, there is provided the improvement which comprises separating the metal ion component of said catalyst by contacting the reaction solution with a chelating agent for such ion to produce an aqueous medium-soluble metal chelate compound and separating said metal chelate compound from said reaction solution by liquid-liquid extraction into an aqueous medium.

The term "polyphenylene ether" includes those polymers disclosed and claimed in Hay, U.S. 3,306,874 and 3,306,875, whenever produced by an oxidative coupling reaction comprising passing an oxygen-containing gas through a reaction solution of a phenol and a metal-amine complex catalyst. The term in its broadest sense includes various copolymers and blends of the polyphenylene ethers formed by interpolymerization with other monomers or polymers, such as the polyolefins, polystyrenes, polycarbonates and the like.

In general, the polyphenylene ether resins will be of the formula

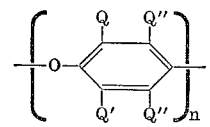

wherein Q is a monovalent substituent such as hydrogen, a hydrocarbon radical, a halohydrocarbon radical having at least two carbon atoms between the halogen atom and the phenol nucleus, hydrocarbonoxy radicals and halohydrocarbonoxy radicals having at least two carbon atoms between the halogen atom and the phenol nucleus, Q' and Q" are the same as Q and in addition, halogen, with the proviso that Q, Q' and Q" are all free of a tertiary alpha-carbon atom, and $n$ is a whole integer equal to at least 50.

The polyphenylene ethers are made by treating a solution of the corresponding phenol, optionally substituted with chlorine, bromine or iodine in the para-position, with an oxygen-containing gas in the presence of a metal-amine complex catalyst. The metal component can comprise copper, manganese, cobalt, nickel, vanadium, chromium and salts thereof, but copper is preferred. Primary, secondary and tertiary amines may be used as the amine component of the catalyst. The reaction solvent is to be capable of liquid-liquid extraction with an aqueous medium to terminate the reaction by breaking the complex catalyst into its components and by removing the metallic component. Therefore, the solvent will be water immiscible. The reaction solvent can be a halogenated aliphatic solvent, e.g., trichloroethylene, or an aromatic solvent, e.g., benzene, toluene, xylene, chlorobenzene, nitrobenzene, and the like, as well as many others which will be obvious to those skilled in this art. Especially preferred solvents are aromatic hydrocarbons, e.g., toluene or benzene.

The polyphenylene ether-forming reaction can be carried out under a wide variety of well known process conditions. Merely by way of illustration, a copper halide can be mixed with an aliphatic amine in an aromatic solvent, then oxygen or an oxygen-containing gas can be introduced while the appropriate phenol is fed into the agitated reaction mixture at a moderate temperature, for example, in the range of 25–50° C. The degree of polymerization is primarily controlled by the reaction time, although catalyst activity, promotors, temperature, oxygen flow rate and other parameters have known effects. To save unnecessarily detailed explanation of these known process details, reference is made to the above-mentioned Hay patents.

At the point where the polymerization reaction reaches the desired yield, and the polymer reaches a desired molecular weight, the reaction solution will comprise a solution of polyphenylene ether, typically from 1 to 30% by weight and usually from 2 to 20% by weight, metal and amine, typically from about 0.005 to 1.5% by weight of metal, from about 0.5 to about 2.0% by weight of amine and minor amounts of other materials, such as various promotors, byproducts, unreacted monomer and the like. Such reaction solutions are then treated with the chelating agents in accordance with the present process.

A wide variety of chelating agents are effective in the present process, the choice being primarily dictated by economic considerations. They may be organic as well as inorganic in nature. In general, however, the prefererd agents will comprise a polyfunctional carboxylic acid containing compound, such as sodium potassium tartrate, nitrilotriacetic acid, citric acid, glycine and especially preferably they will be selected from polyalkylenepolyamine polycarboxylic acids, aminopolycarboxylic acids, aminocarboxylic acids, polycarboxylic acids and their alkali metal, alkaline earth metal or mixed alkali metal-alkaline earth metal salts. For example, the preferred agents will include ethylenediaminetetraacetic acid, hydroxyethylethylenediaminetriacetic acid, diethylenetriaminepentaacetic acid and their salts. Special mention is mde of ethylenediaminetetraacetic acid or a mono-, di-, tri- and tetrasodium salt thereof and of nitrilotriacetic acid, citric acid and glycine, and their corresponding salts.

The manner of contacting the reaction solution with the chelating agent is not critical to the invention. For example, the chelating agent may be added in one portion to the reaction mixture. The chelated metallic catalyst component can then be extracted by the water produced in the polymerization reaction by centrifuging and decanting.

On the other hand, the chelating agent may be added in two or more portions, with additional water, above and beyond that produced in the polymerization reaction. After each contact, liquid-liquid extraction is accomplished in suitable process equipment, e.g., a decantation tank, by stirring, separating the layers, and/or centrifuging and decanting.

In any event, washing the reaction mixture with water after contacting with the chelating agent has a beneficial effect on reducing the amount of metal ultimately found in the polymer.

In addition to batch type extractions, the present process is applicable to continuous liquid-liquid extraction. For example, the reaction solution can be contacted in an extraction column of the multistage type using an aqueous stream of chelating agent as a extractant. Most efficiently, this will be done in a countercurrent fashion and the reaction solution can be introduced into the bottom of a column to pass upwardly against a downwardly flowing aqueous stream of chelating agent. Polymer solution substantially free of copper residue can be recovered from the top of the column. The factors controlling the use and efficiency of such columns are well known to those skilled in the art, and to save unnecessarily detailed explanation, the disclosure in Modan, U.S. 3,630,995 which describes the use of such columns using aqueous acids (which are not chelators) as an extractant is incorporated herein by reference.

Although relatively large amounts of the chelating agents can be used, e.g., from 0.1 mole to about 100 moles per mole of metal ion in the reaction solution, it is economically advantageous to select an amount which is sufficient to provide from about 0.25 to about 5.0 moles and preferably about 0.5 to about 3.5 moles of chelating agent per mole of metallic catalyst component.

In batch-type processes, the time of contact can vary widely, e.g., from 1 or 2 minutes up to 48 hours or more. Generally speaking, however, stirring for from about 15 minutes to about 2 hours will be sufficient.

In the continuous multistage liquid-liquid extraction embodiments. the chelating agents are used in aqueous solution at concentrations which give good extraction efficiency, e.g., from about 1 to about 40% by weight in water. The lower concentrations, e.g., from about 1 to about 10% by weight, are preferred and it is desirable that the ratio of the organic phase or reaction solution to the aqueous phase or chelating agent solution vary between 50:1 and 15:1 with the higher ratios being used at higher concentrations of chelating agent in the aqueous phase.

As will be understood by those skilled in the art, the flow rate of the reaction solution should not be increased without a corresponding increase in the aqueous chelating agent flow rate, otherwise the efficiency of the multistage extraction operation will be decreased to a commercially unacceptable level.

The manner of isolating the polyphenylene ether from the solution after removal of the metallic component as a chelate is not critical to the invention. For example, the polyphenylene ether can be isolated by precipitation from a reaction solution with an excess of an alcohol, such as methanol. The filtered product can be slurried in alcohol and, if desired, stirred with a decolorizing agent and then the polyphenylene ether is filtered off and converted to films, fibers, molded articles and the like by conventional methods.

The amine component of the catalyst can be recovered by distillation or other conventional procedures.

As has been mentioned, a preferred aspect of the present process is to prepare polyphenylene ether solutions of low metal content. from which the polymers are recovered by the so-called total isolation procedures, e.g., spray drying, steam precipitation and hot water crumbing. This facilitates commercial application of such processes, which are more economical with respect to process energy requirements, solvent losses, and the like, than the precipitation methods of the prior art.

According to one feature of the invention, the polymer is recovered by a spray-drying total isolation procedure which comprises terminating the oxidative coupling reaction and removing the metal component of the catalyst residue from the reaction solution by liquid-liquid contacting with the aqueous solution of the chelating agent, separating the so-treated reaction solution, and thereafter spray-drying the reaction solution to produce the polyphenylene ether in a discrete particulate form.

According to another feature of the invention the polymer is recovered by a steam precipitation total isolation procedure which comprises terminating the oxidative coupling reaction and removing the metal component of the catalyst residue from the reaction solution by liquid-liquid contacting with a aqueous chelating agent solution, separating the so-treated reaction solution, and thereafter atomizing the reaction solution into intersecting contct with a steam under pressure to flash off the solvent and thereby produce the polyphenylene ether in a discrete particulate form.

Still another preferred feature of the invention is to use a hot water crumbing total isolation procedure which comprises using a steam-distillable reaction solvent, such as trichloroethylene, benzene, toluene or xylene, and terminating the oxidative coupling reaction and removing the metal component of the catalyst residue from the reaction solution by liquid-liquid contacting with an aqueous chelating agent solution, separating the so-treated solution, and thereafter slowly adding the reaction solution into vigorously agitated hot water and producing a dispersion of fine droplets of the reaction solution in the hot water, continuing the vigorous agitation until the solvent in the droplets has been substantially completely steam-distilled off leaving solvent-free particles of said polyphenylene ether suspended in the hot water, and thereafter collecting the polyphenylene ether in the form of a friable, i.e., easily pulverized, crumb.

Specific embodiments of each such procedure will be given in the examples which follow. For further details as to the total isolation procedures, the disclosures in applications Ser. No. 311,820, filed Dec. 4, 1972 (spray-drying); Ser. No. 163,504, filed July 16, 1971 (steam precipitation); and Ser. No. 311,837, filed Dec. 4, 1972 (hot water-crumbing) are incorporated herein by reference.

DESCRIPTION OF THE PREFERRED EMBODIMENTS

The following examples serve to illustrate the invention but they are not intended to limit it thereto, the parts being by weight, unless otherwise stated.

The copper component of the catalyst residue in the isolated polymer in the following examples is determined as follows: The polymer is dissolved in chlorobenzene and analyzed directly by atomic absorption spectrophotometry, using a Perkin-Elmer Model 303 instrument. A standard curve plotting absorbance vs. micrograms of copper per ml. of solution is used. The parts per million of copper in the sample is calculated as follows:

$$\text{P.p.m. copper in PPO} = \frac{\text{Micrograms copper per ml.} \times \text{volume of chlorobenzene solvent}}{\text{Weight of PPO in grams}}$$

wherein PPO is polyphenylene ether.

EXAMPLE 1

The polymerization catalyst is prepared by adding a solution of 0.615 g. of cupric bromide in 4 ml. of methanol to 16.5 g. of di-n-butylamine in 50 ml. of benzene. The catalyst is transferred, with 320 ml. of benzene, to a one-liter reactor equipped with cooling coils, return condenser, oxygen inlet tube, and stirred at 1500 r.p.m. by means of a turbine stirrer. Oxygen is introduced at the rate of 1.5 cu. ft./hr. while a solution of 140 g. of 2,6-xylenol in 160 ml. of benzene is added through a metering pump over a period of 55 minutes. 50 ml. of benzene is then added through the pump. The temperature is maintained at 30° C. by circulating water from a constant temperature bath through the cooling coil. One hour after the beginning of reaction the temperature is increased to 40° C. and the oxygen flow rate is reduced to 0.5 cu. ft./hr. Two hours after the beginning of the reaction the mixture is diluted with an equal volume of benzene, and stirred with 2.0 g. of ethylenediamine-tetraacetic acid for one hour, centrifuged, and the upper layer is decanted.

The polymer is isolated from the solution by a hot-water crumbing technique, as follows: The solution is slowly added through a dropping funnel to two liters of hot water in a 5 liter creased Morton flask, the water being rapidly stirred, and the flask being heated to maintain the temperature between 80 and 100° C. After steam distillation of the benzene is complete, the contents of the flask are cooled to 25° C. and the friable crumb of poly(2,6-dimethyl-1,4-phenylene)ether is filtered off and dried under vacuum at 90° C. The product weighs 126 g. and has an intrinsic viscosity of 0.49 dl./g. The copper content is 21 parts per million (p.p.m.).

For comparison purposes, the reaction mixture is extracted with 60 ml. of 50% aqueous acetic acid instead of ethylene-diaminetetraacetic acid. The copper content of this polymer is 17 p.p.m.

This example demonstrates that in accordance with this invention, using 2 g. of chelating agent, the copper content of a totally isolated polyphenylene ether is reduced almost to the level of that achieved by 30 g. of acetic acid (100% basis), much more economically and without extracting the amine.

EXAMPLE 2

One portion of the polymer solution is stirred for 30 min. with 0.41 g. of ethylenediaminetetraacetic acid (2 moles/mole Cu), centrifuged, decanted and the polymer isolated by hot water crumbing. The copper content is 17 p.p.m.

EXAMPLE 3

One portion of the polymer solution is stirred for 30 min. with 0.55 g. of ethylenediaminetetraacetic acid (2.5 moles per mole Cu), centrifuged, decanted and the polymer isolated by hot water crumbing. The copper content is 6.5 p.p.m.

EXAMPLE 4

One portion of the polymer solution is stirred for 30 min. with 0.205 g. of ethylenediaminetetraacetic acid (1 mole/mole Cu), centrifuged, stirred with another 0.205 g. portion of ethylenediaminetetraacetic acid in 15 ml. of water, centrifuged, decanted and the polymer isolated by hot water crumbing. The copper content is 7.5 p.p.m.

EXAMPLE 5

One portion of the polymer solution is stirred for 30 min. with 0.12 g. of ethylenediaminetetraacetic acid (0.55 mole per mole Cu), centrifuged, stirred again with 0.12 g. of ethylenediaminetetraacetic acid and 15 ml. of water, centrifuged, washed with 50 ml. of water and the polymer isolated by hot water crumbing. The copper content is 11 p.p.m.

EXAMPLE 6

This example demonstrates the suitability of the disodium salt of ethylenediaminetetraacetic acid in the present invention.

Catalyst is prepared from 0.25 g. of cupric chloride and 0.39 g. of sodium bromide in 4 ml. of methanol. The mixture is transferred, along with 10.9 g. of di-n-butylamine and 500 ml. of toluene to a stirred one-liter reactor maintained at a temperature of 30° C. Oxygen is introduced near the bottom of the vessel and a solution of 70 g. of 2,6-xylenol in 70 g. of toluene is added over a period of 15 minutes. After two hours the reaction mixture is diluted with 245 ml. of toluene and separated into five equal portions. One portion is twice extracted with a 10% solution of the disodium salt of ethylene-diaminetetraacetic acid, the ratio of complexing agent to initial copper being 0.55:1 in each extraction. The polymer solution is washed with 20 ml. of water, and the polymer is precipitated by addition of methanol, filtered off and dried. The dried polymer contains 20 p.p.m. of copper. A second portion is extracted with water and carbon dioxide, then twice extracted with the disodium salt of ethylenediaminetetraacetic acid as described above. The copper content of the polymer after precipitation with methanol is only 5 p.p.m.

EXAMPLE 7

The procedure of Example 1 is repeated, substituting as the chelating agent, nitrilotriacetic acid (NTA), at a molar ratio of 2:1 NTA-Cu. The copper content of the polymer is 250–300 p.p.m. Without any chelating agent, the copper content is greater than 1000 p.p.m.

EXAMPLE 8

The procedure of Example 1 is repeated, substituting as the chelating agent, citric acid, at a molar ratio of 3:1 citric acid to Cu. The copper content of the polymer is 37 p.p.m.

EXAMPLE 9

A polymer solution prepared by the procedure of Example 1 is stirred for one hour with 2 g. of ethylenediaminetetraacetic acid, centrifuged, decanted, then atomized into the top of a chamber. A stream of hot nitrogen (150° C.) is introduced and directed to flow countercurrently to the falling droplets, evaporating the benzene. Discrete particles of poly(2,6-dimethyl-1,4-phenylene) ether of low copper content are formed and collected at the bottom of the chamber.

EXAMPLE 10

A polymer solution prepared by the procedure of Example 1 is stirred for one hour with 2.0 g. of ethylenediaminetetraacetic acid and pressurized through an atomizing outlet of a two fluid nozzle, while steam is pressured through another outlet into intersecting contact with the emerging polymer solution droplets. The nozzle is maintained below the surface of the water in a vessel and the poly(2,6-dimethyl-1,4-phenylene)ether of low copper content collects in discrete particulate form, is removed by filtration and dried under vacuum.

EXAMPLE 11

A polymer feed solution containing 0.005 to 0.02% copper ion (as copper oxide), 1 to 2% of di-n-butylamine, and 9% by weight of poly(2,6-dimethyl-1,4-phenylene) ether, all constituents dissolved in toluene, is fed through a rotameter from a hold tank into the bottom of a six inch multi-stage column equipped with a centered agitator. A 2% aqueous solution of ethylenediaminetetraacetic acid is metered into the top of the column with a positive displacement pump. The lighter polymer solution passes countercurrently upwardly through the column and polymer solution substantially free of copper residue is recovered from the top of the column. The polymer is recovered by adding an excess of methanol, an antisolvent, to the polymer solution, washing the precipitate with methanol and drying the precipitate under vacuum at 80° C.

Other modifications in the present process can obviously be made in light of the above teachings. For example, a reaction solution of poly(2,6-diphenyl - 1,4 - phenylene) ether can be substituted for the poly(2,6-dimethyl-1,4-phenylene)ether. Mono-, tri- and tetrasodium ethylenediaminetetraacete, calcium disodium ethylenediaminetetraacetate, hydroxyethylethylenediaminetriacetic acid, sodium potassium tartrate and sodium glycinate, can be substituted for ethylenediaminetetraacetic acid, the disodium salt, nitrilotriacetic acid and citric acid. o, m, p-Xylenes, and mxtures thereof, and trichloroethylene can be substituted for benzene and toluene in Example 1.

The invention in its broader aspects is not limited to the specification, methods, steps and improvements shown and described herein, but departures may be made within the scope of the accompanying claims without departing from the principles of the invention and without sacrificing its chief advantages.

What is claimed is:

1. In a process for forming a polyphenylene ether by an oxidative coupling reaction in the presence of a chelatable metal ion-amine complex catalyst comprising passing an oxygen containing gas through a reaction solution of a phenol and said catalyst, said reaction solution being capable of liquid-liquid extraction with an aqueous solution, the improvement which comprises separating the metal ion component of said catalyst by contacting the reaction solution with a chelating agent for such ion to produce an aqueous medium-soluble metal chelate compound and separating said metal chelate compound from said reaction solution by liquid-liquid extraction into an aqueous medium.

2. A process as defined in Claim 1 wherein the chelating agent is a polyalkylene polyamine polycarboxylic acid, an aminopolycarboxylic acid, aminocarboxylic acid, a polycarboxylic acid or an alkali metal salt, an alkaline earth metal salt or mixed alkali metal-alkaline earth metal salt thereof.

3. A process as defined in Claim 2 wherein said chelating agent comprises ethylenediaminetetraacetic acid or a mono-, di-, tri- or tetrasodium salt thereof.

4. A process as defined in Claim 2 wherein said chelating agent is nitrilotriacetic acid.

5. A process as defined in Claim 2 wherein said chelating agent comprises glycine or a sodium salt thereof.

6. A process as defined in Claim 2 wherein said chelating agent is citric acid.

7. A process as defined in Claim 1 wherein the chelating agent is present in an amount sufficient to provide from about 0.5 to about 3.5 moles of chelating agent per mole of metal ion in the catalyst.

8. A process as defined in Claim 1 wherein the polyphenylene ether is a poly(2,6-dimethyl - 1,4 - phenylene) ether having an average of at least 50 repeating units.

9. A process as defined in Claim 1 wherein the metal ion component of said complex catalyst is a copper ion.

10. A process as defined in Claim 1 wherein the reaction solution comprises a phenol, a copper salt-amine complex catalyst and an aromatic solvent.

11. A process as defined in Claim 1 wherein the aqueous medium comprises by-product water produced in the oxidative coupling reaction.

12. A process as defined in Claim 1 wherein at least part of the aqueous medium is brought into contact with the reaction mixture in admixture with said chelating agent.

13. A process as defined in Claim 1 wherein contacting with the chelating agent is carried out in at least two separate steps.

14. A process as defined in Claim 1 including the step of liquid-liquid extracting the reaction solution with water after separating said metal chelate compound.

15. A process as defined in Claim 12 wherein the contacting step is carried out by passing the reaction solution through a multi-stage extraction column countercurrently to an aqueous stream containing said chelating agent.

16. A process as defined in Claim 15 wherein the aromatic solvent is selected from the group consisting of benzene, toluene and xylene.

17. A process as defined in Claim 1 wherein the polyphenylene ether resin is recovered by a total isolation procedure.

18. A process as defined in Claim 17 wherein the total isolation procedure comprises spray-drying the reaction solution to produce the polyphenylene ether in discrete particulate form.

19. A process as defined in Claim 17 wherein the total isolation procedure comprises atomizing the reaction solution into intersecting contact with steam under pressure to thereby produce the polyphenylene ether in a discrete particulate form.

20. A process as defined in Claim 18 wherein the total isolation procedure comprises using a steam-distillable solvent and slowly adding the reaction solution into vigorously agitated hot water and producing a dispersion of fine droplets of the reaction solution in the hot water, continuing the vigorous agitation until the solvent in the droplets has been substantially completely steam distilled off, and thereafter collecting the polyphenylene ether in the form of a friable crumb.

References Cited
UNITED STATES PATENTS

| | | | |
|---|---|---|---|
| 3,306,875 | 2/1967 | Hay | 260—47 |
| 3,438,767 | 4/1969 | Busch | 75—117 |
| 3,630,995 | 12/1971 | Modan | 260—47 |

MELVIN GOLDSTEIN, Primary Examiner